(12) United States Patent  (10) Patent No.: US 7,714,557 B2
Hasegawa  (45) Date of Patent: May 11, 2010

(54) DC-DC CONVERTER, POWER SUPPLY SYSTEM, AND POWER SUPPLY METHOD

(75) Inventor: Morihito Hasegawa, Kasugai (JP)

(73) Assignee: Fujitsu Microelectronics Limited, Yokohama (JP)

(*) Notice: Subject to any disclaimer, the term of this patent is extended or adjusted under 35 U.S.C. 154(b) by 218 days.

(21) Appl. No.: 12/057,001

(22) Filed: Mar. 27, 2008

(65) Prior Publication Data

US 2008/0238395 A1  Oct. 2, 2008

(30) Foreign Application Priority Data

Mar. 27, 2007  (JP) ............................. 2007-082596

(51) Int. Cl.
  *G05F 1/00* (2006.01)
  *H02M 3/156* (2006.01)
(52) U.S. Cl. .................... 323/283; 323/901; 323/351
(58) Field of Classification Search .......... 323/283, 323/901, 351, 238, 241, 321, 211; 363/49, 363/21.13, 21.09, 21.05
See application file for complete search history.

(56) References Cited

U.S. PATENT DOCUMENTS

| 4,521,764 A * | 6/1985 | Burton ..................... 341/138 |
| 5,243,904 A * | 9/1993 | Hayama et al. ............ 101/120 |
| 7,262,996 B2 * | 8/2007 | Cheung .................. 365/185.18 |
| 2004/0022078 A1 * | 2/2004 | Shieh ....................... 363/49 |
| 2006/0033647 A1 * | 2/2006 | Leung et al. ............... 341/50 |

FOREIGN PATENT DOCUMENTS

| JP | 2004-23948 A | 1/2004 |
| JP | 2004-173386 A | 6/2004 |
| JP | 2006-288054 A | 10/2006 |

* cited by examiner

*Primary Examiner*—Mark A Robinson
*Assistant Examiner*—Jeffrey Gblende
(74) *Attorney, Agent, or Firm*—Arent Fox LLP

(57) ABSTRACT

According to an embodiment, a DC-DC converter comprises: an error amplifier that receives a soft start signal and amplifies a difference between an output voltage signal and a reference voltage signal; a PWM control circuit that controls ON and OFF states of a first switching transistor and a second switching transistor based on the output of the error amplifier; a frequency divider that divides a frequency signal and outputting a divided frequency signal; an accumulator that performs an adding operation based on the divided frequency signal and a control signal; and a DA converter that generates the soft start signal based on an output of the accumulator.

20 Claims, 5 Drawing Sheets

US 7,714,557 B2

DC-DC CONVERTER, POWER SUPPLY SYSTEM, AND POWER SUPPLY METHOD

CROSS-REFERENCE TO RELATED APPLICATIONS

This application claims the benefit of priority from Japanese Patent Application No. 2007-082596 filed on Mar. 27, 2007, the entire contents of which are incorporated herein by reference.

BACKGROUND OF THE INVENTION

1. Field of the Invention
The application is related to DC-DC converter.
2. Description of the Related Art
FIG. 1 shows a multi-channel power supply circuit arrangement disclosed in Japanese Laid-open Patent Publication No. 2004-23948. An oscillator 100 generates a basic pulse Pbp with an oscillation period that depends on a resistance value of a resistor Rd connected to a soft start setting terminal 300. A counter circuit 210 counts up 4 bit-sized digital signals S1 to S4 by counting a number of the basic pulses Pbp from the oscillator 100. A DA converter 230 converts the digital signals S1 to S4 input from the counter circuit 210 into an analog signal Vs having a resistance divided into sixteen levels, and outputs the analog signal Vs. For this conversion, a series resistance circuit having 16 resistors, R10 to R160, is used. The analog signal Vs is sequentially switched one level at a time in accordance with the 4 bit-sized digital signals S1 to S4, and is outputted as a consecutively rising voltage signal. This enables a soft start operation.

Other art related to a soft start circuit is disclosed in Japanese Laid-open Patent Publications No. 2006-288054, and No. 2004-173386.

SUMMARY OF THE INVENTION

According to an embodiment, a DC-DC converter comprises: an error amplifier that receives a soft start signal and amplifies a difference between an output voltage signal and a reference voltage signal; a PWM control circuit that controls ON and OFF states of a first switching transistor and a second switching transistor based on the output of the error amplifier; a frequency divider that divides a frequency signal and outputs a divided frequency signal; an accumulator that performs an adding operation based on the divided frequency signal and a control signal; and a DA converter that generates the soft start signal based on an output of the accumulator.

DESCRIPTION OF THE PREFERRED EMBODIMENTS

Figure 1:
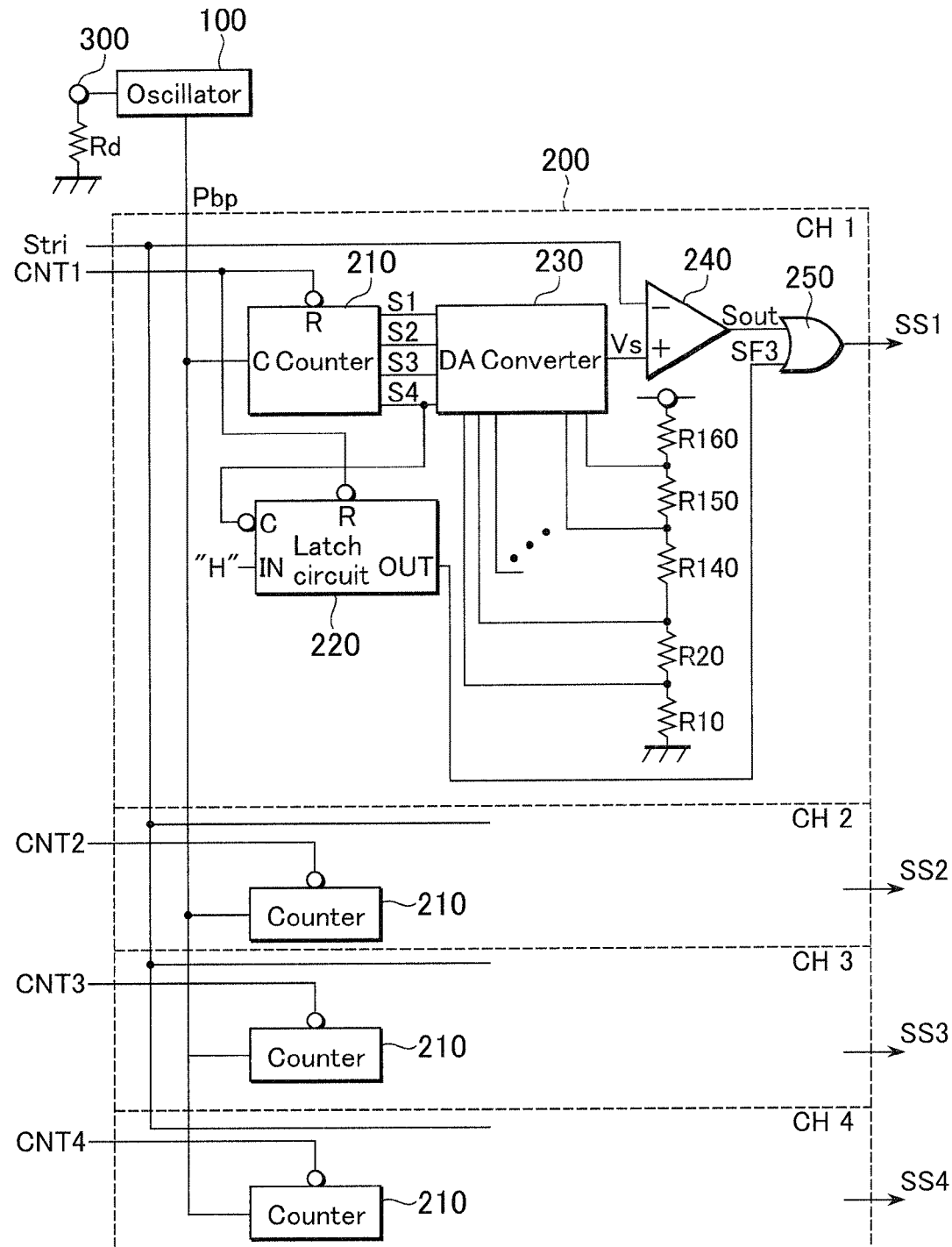
FIG. 1 shows a multi-channel power supply circuit arrangement.

A time gradient of the analog signal Vs that regulates the soft start time and that increases sequentially can be varied in accordance with the bit numbers of the digital signals S1 to S4 outputted from the counter circuit 210.

The minimum and the maximum voltage values of the analog signal Vs outputted from the DA converter 230 are set to predetermined voltage values consistent with an operating range of latter circuits, for example, an operation amplifier 240 and logic gate 250. A digital signal is converted into an analog signal corresponding to a voltage obtained by equally dividing the difference between the maximum voltage and the minimum voltage by a combination of a number of logic levels of the digital signal. If the oscillation period generated by the oscillator 100 of the basic pulses Pbp is constant, when the digital signal is composed of fewer bits, the analog signal Vs takes less time to reach the maximum voltage value from the minimum voltage value, thus making the time gradient steeper. This, in turn, can cause the soft start time to become shorter.

For example, if the digital signal is composed of 4 bits, the analog signal Vs travels from the minimum voltage value to the maximum voltage value in sixteen stages. If the digital signal is composed of 5 bits, the analog signal Vs travels from the minimum voltage value to the maximum voltage value in thirty-two stages. If the oscillation period of the basic pulse Pbp is constant, the analog signal Vs rises with a steeper gradient in the case of the 4-bit digital signal due to the fewer stages between the minimum voltage value and the maximum voltage value.

Therefore, in order to adjust the soft start time, the bit number of the digital signal counted by the counter circuit 210 must be adjusted. In the DA converter 230, the voltage values resulting from the DA conversion of the digital signal must be changed in accordance with the bit number of the adjusted digital signal. The circuit configuration of the counter circuit 210 and the DA converter 230 must be changed in accordance with adjustment of the soft start time. Therefore, it is difficult to adjust and change the soft start time during actual use. Furthermore, circuit size enlarges because it is necessary to switch and change the circuit configuration of the counter circuit 210 and the DA converter 230 in order to adjust and change the soft start time during actual use.

Figure 2:
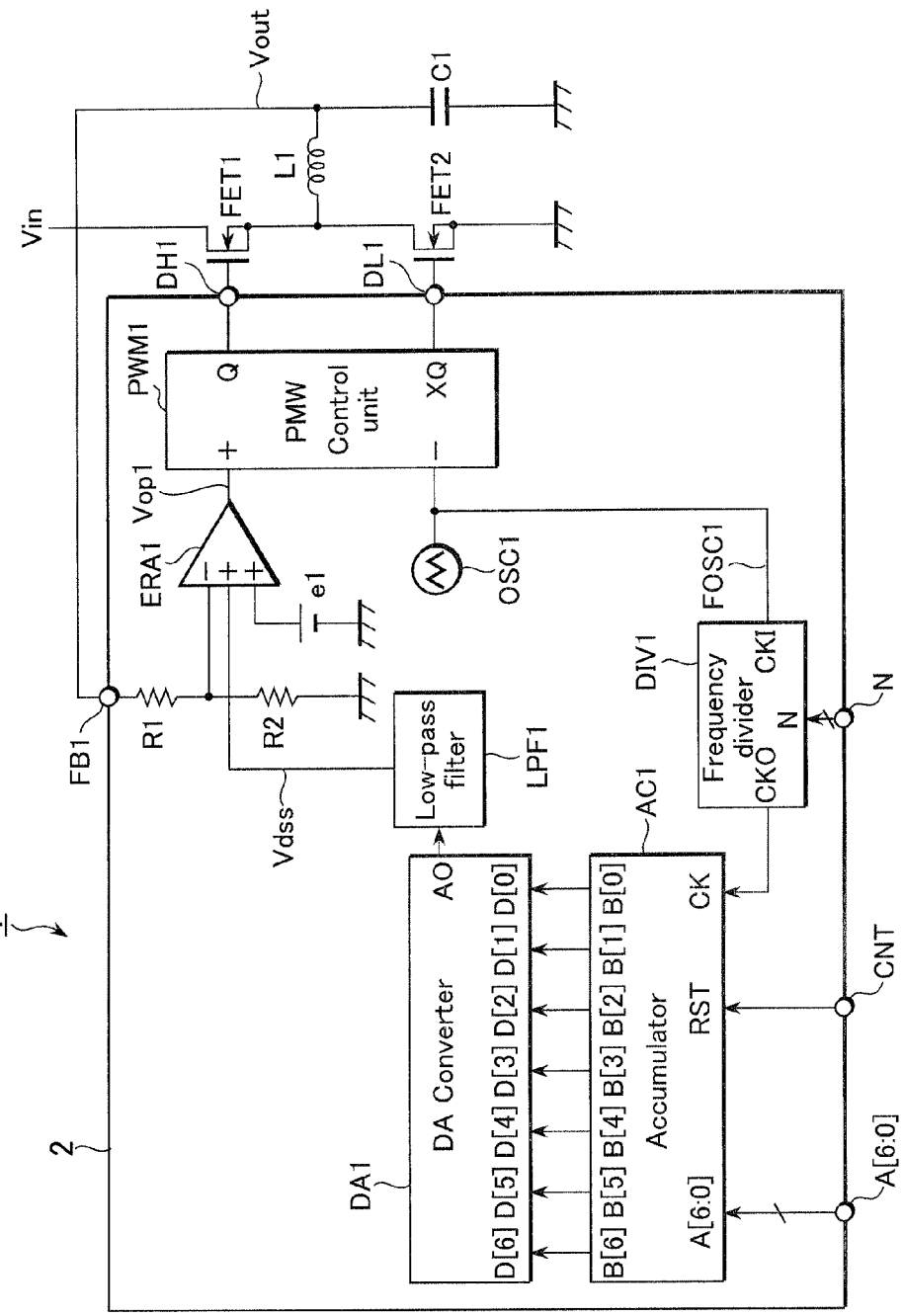
FIG. 2 shows a first embodiment.

FIG. 2 shows a DC-DC converter 1 of the first embodiment. The DC-DC converter 1 is a step-down type DC-DC converter using a main switching transistor FET1 with an N-MOS construction.

The DC-DC converter 1 includes a control circuit 2, the main switching transistor FET 1, a synchronous rectification transistor FET 2, a coil L1, and a capacitive element C1. The main switching transistor FET 1 and the synchronous rectification transistor FET 2 are connected in this order between the input power source Vin and ground. One end of the coil L1 is connected to the connecting point between the main switching transistor FET 1 and the synchronous rectification transistor FET 2. The other end of the coil L1 is connected to a feedback terminal FB1, the capacitive element C1, and the control circuit 2.

The control circuit 2 controls the main switching transistor FET1 and the synchronous rectification transistor FET2. The control circuit 2 includes a triangle wave oscillator OSC1, a frequency divider DIV1, an accumulator AC1, a DA converter DA1, a low-pass filter LPF1, resistance elements R1, R2, a reference power source e1, an error amplifier ERA1, and a PWM control unit PWM1.

The triangle wave oscillator OSC1 transmits a signal to a negative terminal of the PWM control unit PWM1 and a clock input terminal CK1 of the frequency divider DIV1. A frequency division ratio terminal N of the frequency divider DIV1 is connected to the frequency division ratio terminal N of the control circuit 2. A CPU (not shown in FIG. 2) variably adjusts the value input to the frequency division ratio terminal N of the control circuit 2. Changing the signal at the frequency division ratio terminal N allows the frequency division ratio of the frequency divider DIV1 to be varied. For example, when the signal of the frequency division ratio terminal N is 2, the frequency divider DIV1 operates as a divide-by-two frequency divider, and the frequency divider DIV1 operates as a divide-by-three frequency divider when the signal of the frequency division ratio terminal N is 3. Changing these frequency division ratios flexibly adjusts the frequency of the clock signal transmitted to the clock input terminal CK of the accumulator AC1.

A clock output terminal CK0 of the frequency divider DIV1 is connected to the clock input terminal CK of the accumulator AC1, and a control terminal CNT of the control circuit 2 is connected to a reset input terminal RST of the accumulator AC1. An accumulated value input terminal A[6:0] of the control circuit 2 is connected to the accumulated value input terminal A[6:0] of the accumulator AC1. A signal from the CPU (not shown in FIG. 2) is input to the control terminal CNT and the accumulated value input terminal A[6:0] of the control circuit 2. An accumulated value output terminal B[6:0] of the accumulator AC1 is connected to the input terminal D[6:0] of the DA converter DA1.

Figure 3:
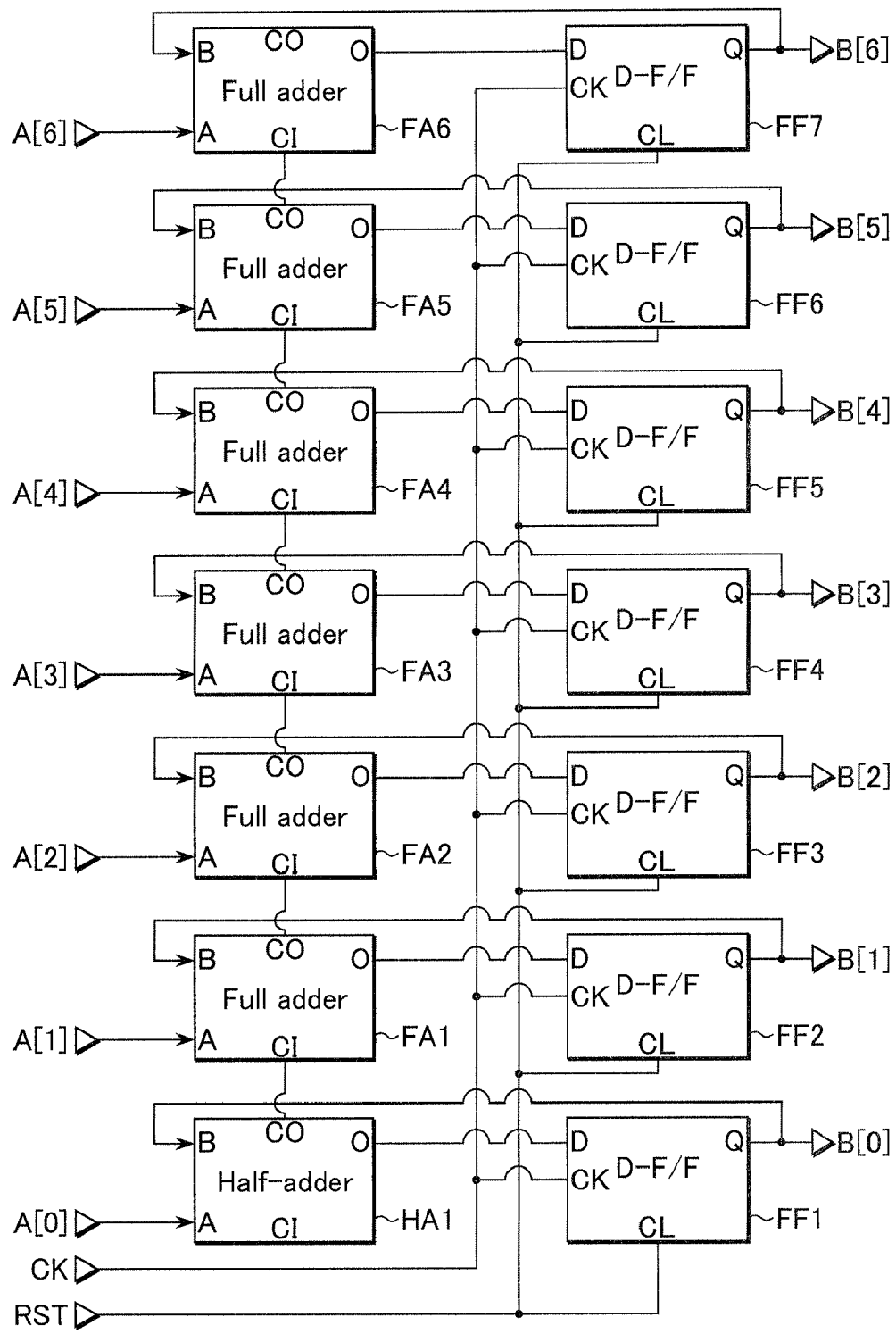
FIG. 3 shows an exemplary block diagram of an accumulator.

FIG. 3 shows an exemplary block diagram of the accumulator AC1 of FIG. 2. The accumulator AC1 includes a half-adder HA1, full adders FA1 to FA6, and D flip-flops (labeled as D-F/F in the figure) FF1 to FF7.

The accumulated value input terminals A[0] to A[6] are connected to terminals A of the half adder HA1 and the full adders FA1 to FA6, respectively. A carry output terminal CO of the half-adder HA1 is connected to a carry input terminal C1 of the full adder FA1. The carry output terminal CO of each respective full adder FA1 to FA5 is connected to the carry input terminal C1 of each respective full adder FA2 to FA6. Thus, the half-adder HA1 and the full adders FA1 to FA6 make up a 7-bit accumulator. Furthermore, the result output terminals 0 of the half-adder HA1 and the full adders FA1 to FA6 are connected to data terminals D of the D flip-flops FF1 to FF7, respectively. Output terminals Q of D flip-flops FF1 to FF7 are connected to respective terminals B of the half-adder HA1 and the full adders FA1 to FA6 and the accumulated value output terminals B[0] to B[6].

Clock input terminal CK of the accumulator AC1 is connected to the clock input terminals CK of the D flip-flops FF1 to FF7. Therefore, the value of the accumulated value input terminal A[6:0] is added every time a clock signal is input to the clock input terminal CK of the accumulator AC1. This addition allows the soft start time to be flexibly adjusted and changed without changing the circuit configuration.

Furthermore, the reset input terminal RST of the accumulator AC1 is connected to clear terminals CL of the D flip-flops FF1 to FF7. When the reset input terminal RST is high, the D flip-flops FF1 to FF7 are reset so that the value of the accumulated value output terminal B[6:0] becomes 0.

DA converter DA1 in FIG. 2 is composed of an R2R ladder circuit. The DA converter DA1 outputs an analog voltage value based on the signal from the input terminal D [6:0] from an analog output terminal AO.

The signals from the analog output terminal AO is input to a first non-inverting input terminal of the error amplifier ERA1 as a soft start voltage Vdss via the low-pass filter LPF1.

The signal from a feedback terminal FB1 is divided by resistance elements R1 and R2, and is then input to an inverting terminal of the error amplifier ERA1. The output voltage of the reference power source e1 is input to a second non-inverting terminal of the error amplifier ERA1. The error amplifier ERA1 prioritizes the soft start voltage Vdss out of the soft start voltage Vdss and the output voltage of the reference power source e1 that are input to the first and second non-inverting terminals, respectively, and determines an output voltage Vop1.

The output voltage Vop1 is input to the positive terminal of the PWM control unit PWM1. The PWM control unit PWM1 outputs the signal controlling the main switching transistor FET1 from the output terminal Q of the PWM control unit PWM1 via a high-side output terminal DH1 of the control circuit 2. The PWM control unit PWM1 outputs the signal controlling the synchronous rectification transistor FET2 from an output terminal XQ of the PWM control unit PWM1 via a low-side output terminal DL1 of the control circuit 2.

Figure 4:
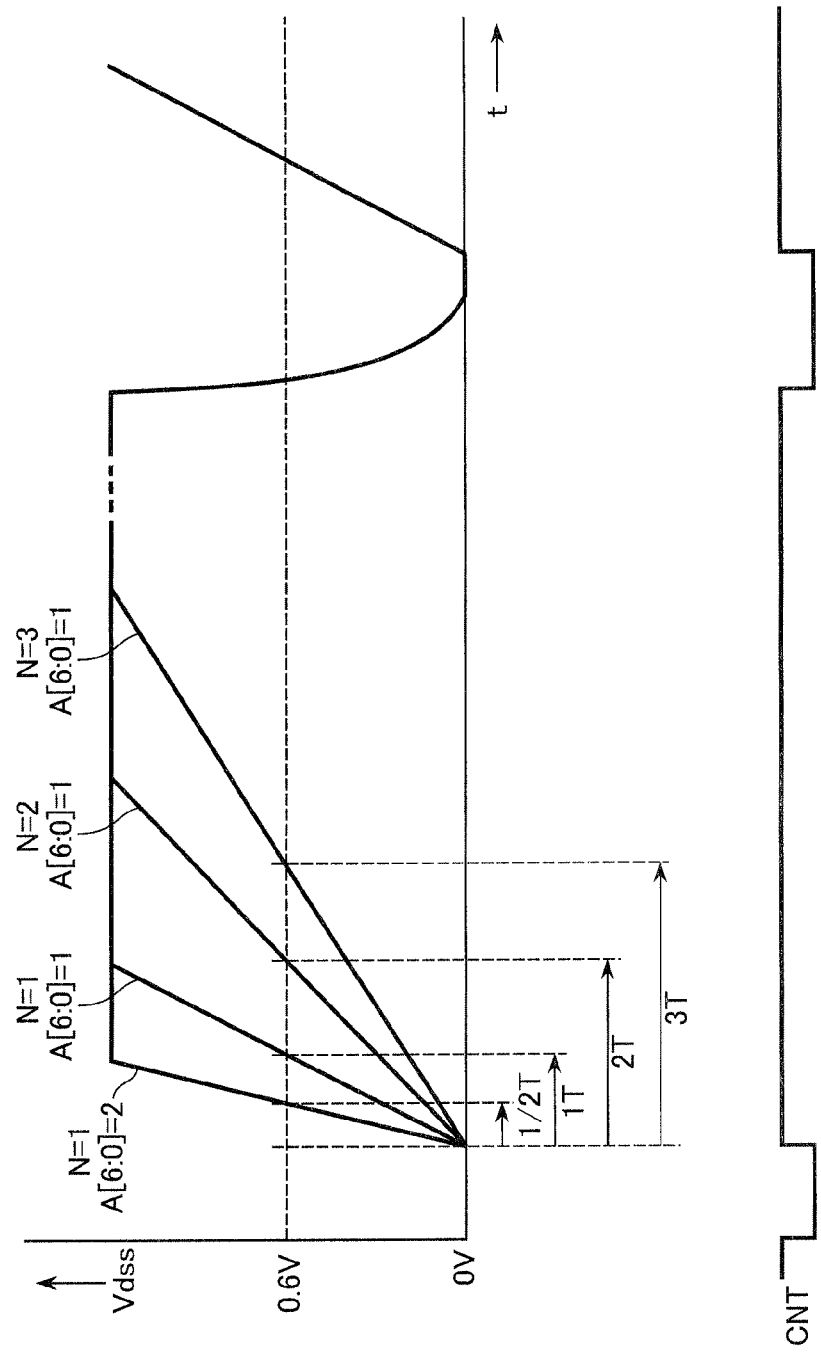
FIG. 4 is an exemplary timing chart of a DC-DC converter.

FIG. 4 shows an exemplary timing chart for the DC-DC converter 1 of the first embodiment. The horizontal axis shows time (t), and the vertical axis shows the soft start voltage Vdss.

When the signal of the accumulated value input terminal A[6:0] is 1, and the signal at the frequency division ratio terminal N takes values of 1, 2, and 3, a soft start time T, which is the time taken for the soft start voltage Vdss to reach the voltage (0.6 V in the present embodiment) of the reference power source e1, is 1T, 2T, and 3T, accordingly. When the signal value of the accumulated value input terminal A[6:0] is set to 2, the soft start time becomes ½T.

In this case, soft start time T is T=(Ve1/(A[6:0]*Vdac))× N÷FOSC1. In this formula, Ve1 is a voltage of the reference power source e1, Vdac is a resolution of the DA converter, and FOSC1 is an oscillating frequency of the triangle wave oscillator OSC1.

As described in detail above, the DC-DC converter 1 of the first embodiment, as shown in FIG. 2, sequentially adds value of the control signal for each division frequency signal, DA converter converts the values according to the output of the accumulator, and outputs a sequentially increasing signal for soft start. Then, the signal for soft start controls the output voltage of the DC-DC converter 1 of FIG. 2.

As described above, when the soft start operation at startup is conducted with digital control, the DC-DC converter 1 of the first embodiment is capable of flexibly adjusting and changing the soft start time without changing the circuit configuration.

Figure 5:
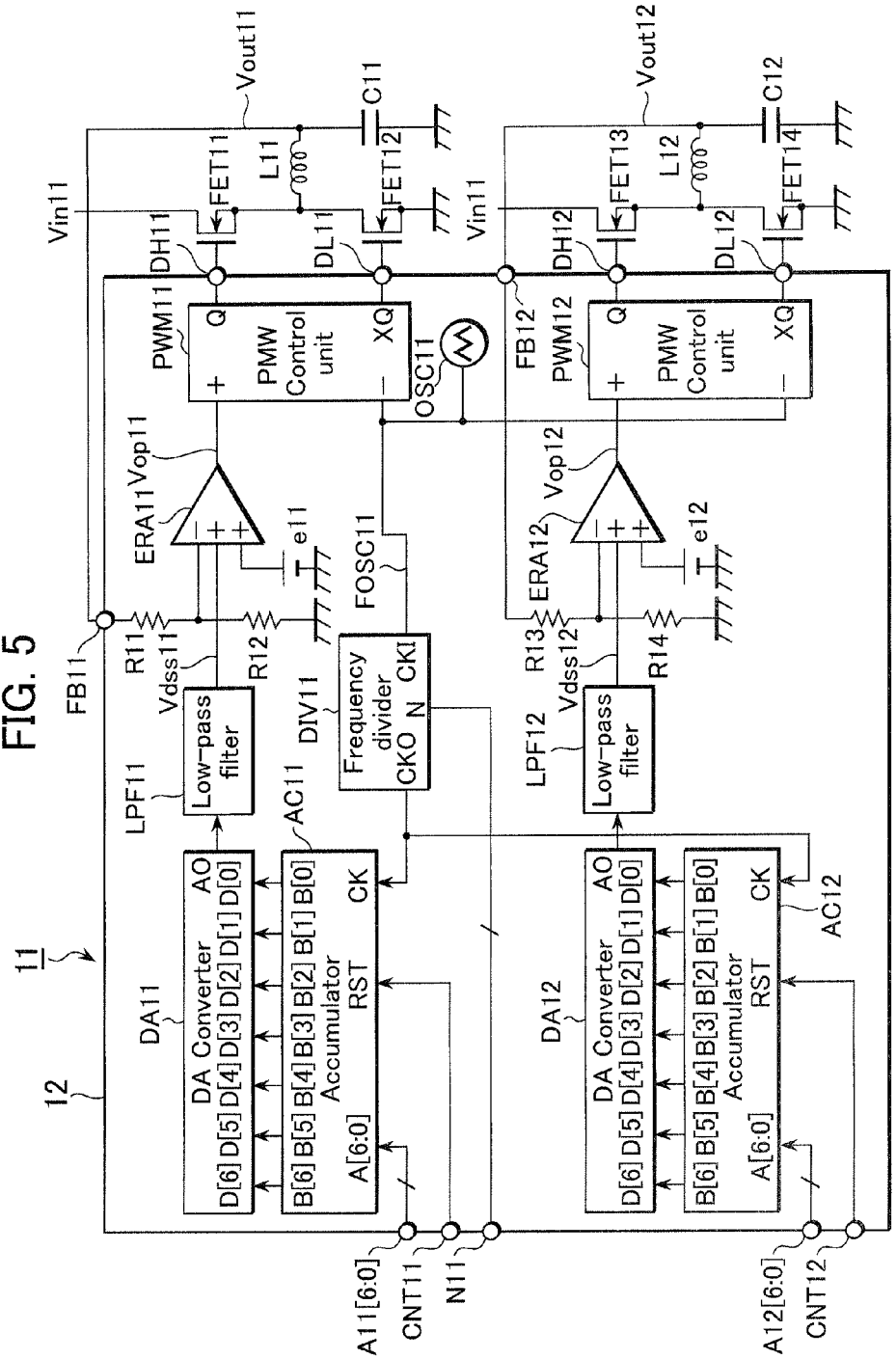
FIG. 5 shows a second embodiment.

FIG. 5 shows a two-channel DC-DC converter 11 of the second embodiment. The two-channel DC-DC converter 11 is a step-down type DC-DC converter combining two channels, each including the DC-DC converter 1 of the first embodiment.

The two-channel DC-DC converter 11 includes a control circuit 12, a first main switching transistor FET 11, a first synchronous rectification transistor FET12, a first coil L1, a first capacitive element C11, a second main switching transistor FET13, a second synchronous rectification transistor FET14, a second coil L12, and a second capacitive element C12.

Between the input power source Vin11 and ground, the first main switching transistor FET11 and the first synchronous rectification transistor FET12, which both can be NMOS transistors, are connected in this order. One end of the first coil L11 is connected at the connecting point between the main switching transistor FET11 and the synchronous rectification transistor FET12. The other end of the coil L11 is connected to a feedback terminal FB11, the first capacitive element C11, and the control circuit 12.

Meanwhile, the main switching transistor FET13 and the second synchronous rectification transistor FET12, which both can be NMOS transistors, are connected in this order between the input power source Vin11 and grounding potential. One end of the second coil L12 is connected at the connecting point between the second main switching transistor FET13 and the synchronous rectification transistor FET14. The other end of the coil L12 is connected to a feedback terminal FB12, the second capacitive element C12, and the control circuit 12.

The control circuit 12 controls the first main switching transistor FET11, the first synchronous rectification transistor FET12, the second main switching transistor FET13, and the second synchronous rectification transistor FET14. The control circuit 12 includes a triangle wave oscillator OSC11, a frequency divider DIV11, accumulators AC11 and AC12, DA converters DA11 and DA12, low-pass filters LPF11 and LPF12, resistance elements R11 to R14, reference power sources e11 and e12, error amplifiers ERA11 and ERA12, and PWM control units PWM11 and PWM12.

The output signal from the triangle wave oscillator OSC11 are input to negative terminals of the PWM control units PWM11 and PWM12, and to a clock input terminal CK1 of the frequency divider DIV11. A frequency division ratio terminal N11 of the control circuit 12 is connected to the frequency division ratio terminal N of the frequency divider DIV11. A CPU (not shown in FIG. 5) controls values input to the frequency division ratio terminal N11 of the control circuit 12. Although the signal at the frequency division ratio terminal N11 is changed in the same way as in the DC-DC converter 1 of the first embodiment, in the second embodiment, the frequency division ratio of the frequency divider DIV11 can be variably adjusted.

A clock output terminal CK0 of the frequency divider DIV11 is connected to the clock input terminal CK of the accumulator AC11, and a control terminal CNT11 of the control circuit 12 is connected to a reset input terminal RST of the accumulator AC 11. An accumulated value input terminal A11[6:0] of the control circuit 12 is connected to the accumulated value input terminal A[6:0] of the accumulator AC11. The control terminal CNT11 of the control circuit 12 and the accumulated value input terminal A11[6:0] are controlled by the CPU (not shown in FIG. 5). An accumulated value output terminal B[6:0] is connected to the input terminal D[6:0] of the DA converter DA11. It should be noted that the configuration of the accumulator AC11 is the same as that of the accumulator AC1 shown in FIG. 3.

DA converter DA11 is composed of an R2R ladder circuit. The DA converter DA11 outputs an analog voltage value based on the signal from the input terminal D[6:0] from the analog output terminal AO.

The signal from the analog output terminal AO of DA converter DA11 is input to a first non-inverting input terminal of the error amplifier ERA11 as soft start voltage Vdss11 via the low-pass filter LPF11.

The signal from a feedback terminal FB11 is divided by resistance elements R11 and R12, and is then input to an inverting terminal of the error amplifier ERA11. The output voltage of the reference power source e1 is input to a second non-inverting terminal of ERA11. The error amplifier ERA11 prioritizes the soft start voltage Vdss11 out of the soft start voltage Vdss11 and the output voltage of the reference power source e11 that is input to the first and second non-inverting terminals, respectively, and determines an output voltage Vop11.

The output voltage Vop11 is input to the positive terminal of the PWM control unit PWM11. The PWM control unit PWM11 outputs a signal controlling the first main switching transistor FET11 via a high-side output terminal DH11 of the control circuit 12 from an output terminal Q of the PWM control unit PWM11. The PWM control unit PWM11 outputs a signal controlling the first synchronous rectification transistor FET12 from an output terminal XQ of the PWM control unit PWM11 via a low-side output terminal DL11 of the control circuit 12.

A clock output terminal CK0 of the frequency divider DIV11 is also connected to the clock input terminal CK of the accumulator AC12, and a control terminal CNT12 of the control circuit 12 is connected to a reset input terminal RST of the accumulator AC 12. An accumulated value input terminal A12[6:0] of the control circuit 12 is connected to the accumulated value input terminal A[6:0] of the accumulator AC12. A CPU (not shown in FIG. 5) controls the control terminal CNT12 of the control circuit 12 and the accumulated value input terminal A12[6:0]. An accumulated value output terminal B[6:0] of the accumulator AC12 is connected to the input terminal D[6:0] of DA converter DA12. Since the configuration of the accumulator AC12 is the same as that in the accumulator AC1 shown in FIG. 3, its detailed description is omitted.

The DA converter DA12 is composed of an R2R ladder circuit and outputs an analog voltage value based on the signal from the input terminal D[6:0] from the analog output terminal AO.

The signal from the analog output terminal AO is input into a first non-inverting input terminal of the error amplifier ERA12 as a soft start voltage Vdss12 via the low-pass filter LPF12.

The signal from the feedback terminal FB12 is divided by resistance elements R13 and R14, and is then input to the inverting terminal of the error amplifier ERA12. The output voltage of the reference power source e12 is input into a second non-inverting terminal of the error amplifier ERA12. The error amplifier ERA 12 prioritizes the soft start voltage Vdss12 out of the soft start voltage Vdss12 and the output voltage of the reference power source e12 that are input to the first and second non-inverting terminals, respectively, and determines an output voltage Vop12.

The output voltage Vop12 is input to the positive terminal in the PWM control unit PWM12. The PWM control unit PWM12 outputs a signal controlling the second main switching transistor FET 13 via a high-side output terminal DH12 of the control circuit 12 from an output terminal Q of the PWM control unit PWM12. The PWM control unit PWM12 outputs a signal controlling the second synchronous rectification transistor FET 14 from an output terminal XQ of the PWM control unit PWM12 via a low-side output terminal DL12 of the control circuit 12.

As described in detail above, the two-channel DC-DC converter 11 generates a division frequency signal which is shared in an adding operation of the first and the second accumulators AC11 and AC12, and includes respective soft start circuits for the generating units which generate the first and the second output voltage signals. The first and second soft start circuits start operation after an initializing operation, sequentially perform addition of each of a first control signal and a second control signal in accordance with the shared division frequency signal, DA (digital to analog) convert the results of the additions, and output sequentially increasing the first soft start signal and the second soft start signal. Furthermore, each of the soft start circuits controls output voltage in accordance with the corresponding soft start signal. As described above, setting the respective control signal for each of the generating units of the first and the second output voltages allows the two-channel DC-DC converter 11 of the second embodiment to flexibly set voltage gradients of the first and second soft start output voltages generated by the respective generating units without changing the circuit configuration.

In the two-channel DC-DC converter 11 of the second embodiment, the accumulated value input terminal A11[6:0] and the accumulated value input terminal A12[6:0] can be set separately. It is therefore possible to set a different soft start voltage gradient for each channel without changing the circuit configuration.

It is noted that the first and the second embodiments described and illustrated herein should not be considered as limiting the scope of the present invention, and variations and modifications may be made in accordance with the spirit and scope of the present invention.

For example, although the first and the second embodiments use step-down type DC-DC converters, the present invention is not limited to this, and step-up type and step-up-and-down type DC-DC converters can be used.

Also, although the first and the second embodiments make use of an NMOS construction for the main switching transistors and synchronous rectification transistors, the present invention is not limited to this, and a PMOS construction can also be used for the transistors.

Furthermore, while the second embodiment uses the configuration of the two-channel DC-DC converter 11, the multi-channel DC-DC converter can be used.

What is claimed is:

1. A DC-DC converter comprising:
    an error amplifier that receives a soft start signal and amplifies a difference between an output voltage signal and a reference voltage signal;
    a PWM control circuit that controls ON and OFF states of a first switching transistor and a second switching transistor based on the output of the error amplifier;
    a frequency divider that divides a frequency signal and outputs a divided frequency signal;
    an accumulator that performs an adding operation based on the divided frequency signal and a control signal; and
    a DA converter that generates the soft start signal based on an output of the accumulator.

2. The DC-DC converter according to claim 1, wherein the accumulator controls a soft start time based on the control signal as an accumulated value.

3. The DC-DC converter according to claim 2, wherein the accumulator shortens the soft start time when a value of the control signal increases.

4. The DC-DC converter according to claim 1, wherein a soft start time is set with $(Vref/(AN*Vdac)) \times N \div fosc$, and wherein Vref is a reference voltage, AN is a control signal, Vdac is a DA converter resolution, N is a frequency division ratio, and fosc is a frequency signal.

5. The DC-DC converter according to claim 1, wherein the accumulator resets a soft start time based on a reset signal.

6. The DC-DC converter according to claim 1, wherein the accumulator sets a signal outputted to the DA converter to a constant value when the soft start signal becomes a predetermined value.

7. The DC-DC converter according to claim 1, wherein the error amplifier amplifies a difference between the output voltage signal and one of a group consisting of a signal at a low potential side of the soft signal and a reference voltage signal.

8. A power source supply system comprising:
    a CPU; and
    a DC-DC converter that includes an error amplifier that receives a soft start signal for soft start process and amplifies and outputs a difference between an output voltage signal and a reference voltage signal, and a PWM control circuit that controls ON and OFF states of a first switching transistor and a second switching transistor based on the output of the error amplifier,
    wherein the DC-DC converter includes:
        a frequency divider that divides a frequency signal and outputting a divided frequency signal,
        an accumulator that performs an adding operation based on the divided frequency signal and a control signal, and
        a DA converter that generates the soft start signal based on an output of the accumulator.

9. The power source supply system according to claim 8, wherein the CPU supplies a reset signal, and the DC-DC converter resets the soft start process according to the reset signal.

10. The power source supply system according to claim 8, wherein the CPU supplies a frequency division ratio signal, and the frequency divider divides the frequency signal according to the frequency division ratio signal.

11. A power source supply method comprising:
    amplifying a difference between a reference voltage signal and an output voltage signal or a difference between the reference voltage signal and a signal at a low potential side of a soft start signal;
    performing PWM control for ON and OFF states of a first switching transistor and a second switching transistor based on an output of the error amplifier;
    outputting the output voltage signal;
    dividing a frequency signal to output a divided frequency signal;
    accumulating a set signal according to the divided frequency signal; and
    generating the soft start signal according to result of the accumulation.

12. The power source supply method according to claim 11, wherein a soft start time is shortened when a value of the set signal increases.

13. The power source supply method according to claim 11, wherein soft start time is set with $(Vref/(AN*Vdac)) \times N \div fosc$, and wherein Vref is a reference voltage, AN is a control signal, Vdac is a DA converter resolution, N is a frequency division ratio, and fosc is a frequency signal.

14. A DC-DC converter comprising:
    a first error amplifier that receives a signal for a first soft start and amplifies a difference between a first output voltage signal and a first reference voltage signal;
    a second error amplifier that receives a signal for a second soft start and amplifies a difference between a second output voltage signal and a second reference voltage signal;
    a first PWM control circuit that controls ON and OFF states of a first switching transistor and a second switching transistor based on an output of the first error amplifier;
    a second PWM control circuit that controls ON and OFF states of a third switching transistor and a fourth switching transistor based on an output of the second error amplifier;
    a frequency divider that divides a frequency signal and outputting a divided frequency signal;
    a first accumulator that performs an adding operation based on the first divided frequency signal and a first control signal;
    a second accumulator that performs an adding operation based on the second divided frequency signal and a second control signal;
    a first DA converter that performs the first soft start signal based on an output of the first accumulator; and a second DA converter that generates the second soft start signal based on an output of the second accumulator.

15. The DC-DC converter according to claim 14, wherein the first accumulator controls a first soft start time based on the first control signal as an accumulated value, and the second accumulator controls a second soft start time based on the second control signal as an accumulated value.

16. The DC-DC converter according to claim 14, wherein the first accumulator and the second accumulator shorten either the first soft start time or the second start time when a value of the first control signal or the second control signal increases.

17. The DC-DC converter according to claim 14, wherein a soft start time is set with (Vref/(AN*Vdac))×N÷fosc, and wherein Vref is a reference voltage, AN is a control signal, Vdac is a DA converter resolution, N is a frequency division ratio, and fosc is a frequency signal.

18. The DC-DC converter according to claim 14, wherein the first accumulator resets a first soft start according to a first reset signal, and the second accumulator resets a second soft start according to a second reset signal.

19. A power source supply system comprising:

a CPU;

a first error amplifier receives a signal for a first soft start and amplifiers a difference between a first output voltage signal and a second reference voltage signal;

a second error amplifier that includes receives a signal for a second soft start and amplifiers a difference between a second output voltage signal and a second reference voltage signal;

a first PWM control circuit that controls ON and OFF states of a first switching transistor and a second switching transistor based on an output of the first error amplifier;

a second PWM control circuit that controls ON and OFF states of a third switching transistor and a fourth switching transistor based on an output of the second error amplifier;

a frequency divider that divides a frequency signal and outputs a divided frequency signal;

a first accumulator that performs an adding operation based on the first divided frequency signal and a first control signal supplied from the CPU;

a second accumulator that performs an adding operation based on the second divided frequency signal and a second control signal supplied from the CPU;

a first DA converter that generates the first soft start signal based on an output of the first accumulator; and a second DA converter that generates the second soft start signal based on an output of the second accumulator.

20. The power source supply system according to claim 19, wherein the CPU supplies a frequency division ratio signal, and the frequency divider divides the frequency signal according to the frequency division ratio signal.

* * * * *